US012224084B2

(12) United States Patent
Orbaek White et al.

(10) Patent No.: US 12,224,084 B2
(45) **Date of Patent: *Feb. 11, 2025**

(54) CABLES AND METHODS THEREOF

(71) Applicant: Trimtabs Ltd, Swansea (GB)

(72) Inventors: Alvin Orbaek White, Swansea (GB); Ka Chun Yick, Swansea (GB)

(73) Assignee: Trimtabs Ltd, Swansea (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,523

(22) Filed: Nov. 20, 2023

(65) Prior Publication Data

US 2024/0170187 A1 May 23, 2024

Related U.S. Application Data

(63) Continuation of application No. 17/984,895, filed on Nov. 10, 2022, now Pat. No. 11,823,814, which is a continuation of application No. 17/102,178, filed on Nov. 23, 2020, now Pat. No. 11,508,498.

(60) Provisional application No. 62/940,304, filed on Nov. 26, 2019.

(51) Int. Cl.

*H01B 1/04* (2006.01)
*H01B 11/00* (2006.01)
*H01B 13/22* (2006.01)

(52) U.S. Cl.

CPC ............... *H01B 13/22* (2013.01); *H01B 1/04* (2013.01); *H01B 11/00* (2013.01)

(58) Field of Classification Search

CPC ... H01B 1/02; H01B 1/06; H01B 7/02; H01B 11/18; H01B 13/22; H01B 7/00

USPC ............ 174/74 R, 102 R, 102 SC, 108, 109, 174/106 R, 110 R, 110 SC

See application file for complete search history.

(56) References Cited

U.S. PATENT DOCUMENTS

| | | | |
|---|---|---|---|
| 5,466,480 A | 11/1995 | Zhou et al. |
| 5,619,140 A | 4/1997 | Brey et al. |
| 6,839,494 B2 | 1/2005 | Clatanoff et al. |
| 7,426,779 B2 | 9/2008 | Kida et al. |

(Continued)

FOREIGN PATENT DOCUMENTS

| | | |
|---|---|---|
| CN | 105703089 A | 6/2016 |
| CN | 106957473 A | 7/2017 |

(Continued)

OTHER PUBLICATIONS

Office Action for Taiwan Application No. 109141530 dated Mar. 9, 2022.

(Continued)

*Primary Examiner* — William H. Mayo, III

(74) *Attorney, Agent, or Firm* — Patterson + Sheridan, LLP

(57) ABSTRACT

A cable and methods of making cables are disclosed. In at least one embodiment, a method for making a cable includes introducing a conductive material onto a sheet including a heat-shrink material. The method includes compressing a first portion of the sheet onto a second portion of the sheet to form a sheath having an interior volume, where the conductive material is disposed in the interior volume. In at least one embodiment, a cable includes a sheath including a heat-shrink material. The cable includes an interior volume including a conductive material including a conductive carbon material.

20 Claims, 1 Drawing Sheet

(56) References Cited

U.S. PATENT DOCUMENTS

| | | | | |
|---|---|---|---|---|
| 2009/0194313 A1* | 8/2009 | Jiang | H01B 13/0162 174/102 R |
| 2009/0255706 A1* | 10/2009 | Jiang | H01B 11/1808 174/102 R |
| 2010/0233472 A1* | 9/2010 | Liu | H01B 1/04 428/408 |
| 2013/0240241 A1* | 9/2013 | Dubrow | H01G 4/018 977/948 |
| 2014/0131096 A1* | 5/2014 | Silverman | H05K 9/0088 977/932 |
| 2016/0254076 A1* | 9/2016 | Kulas | H04R 1/1033 174/74 R |

FOREIGN PATENT DOCUMENTS

| | | | | |
|---|---|---|---|---|
| EP | 3422366 A1 * | 1/2019 | H01B 1/04 |
| TW | 1601160 B | 10/2017 | |
| WO | 2005066248 A1 | 7/2005 | |
| WO | WO-2013016445 A1 * | 1/2013 | H01B 1/04 |
| WO | 2017159917 A1 | 9/2017 | |

OTHER PUBLICATIONS

Search Report for Taiwan Application No. 109141530 dated Mar. 1, 2022.

International Search Report and Written Opinion dated Mar. 19, 2021 for Application No. PCT /182020/061056.

YouTube video: http://tiny.cc/Music-to-my-ears.

Hedayati, A.; Barnett, C.J.; Swan, G.; Orbaek White, A. Chemical Recycling of Consumer-Grade Black Plastic into Electrically Conductive Carbon Nanotubes. C. 2019, 5 (2), 32.

Barnett, C.J.; Gowenlock, C.E.; Welsby, K.; Orbaek White, A.; and Barron, A.R. Spatial and Contamination-Dependent Electrical Properties of Carbon Nanotubes. Nano Lett. 2018, 18 (2), 695-700.

"Barnett, C. J., Evans, C., McCormack, J.E., Gowenlock, C. E., Dunstan, P., Adams, W. Orbaek White, A. and Barron, A. R. Experimental Measurement of Angular and Overlap Dependence of Conduction Between Carbon Nanotubes of dentical Chirality and Diameter (2019). Nano Letters, 19(8), 4861--4865J.P. Mackevich; J.W. Hoffman IEEE Electrical Insulation Magazine (vol. 7 , Issue: 4. 1991)".

R.. Kraus; D. Ryan "Advances in Heat Shrink Technology" IEEE Electrical Insulation Magazine (vol. 4,Issue: 3, 1988).

"Kurzepa, Lukasz & Lekawa-Raus, Agnieszka & Patmore, Jeff & Koziol, Krzysztof. (2014). Replacing Copper Wires 6 With Carbon Nanotube Wires in Electrical Transformers. Advanced Functional Materials. vol. 24. pp. 619-624. 10.1002/adfm.201302497."

Yousefi-Darani, Shahrokh & Joshua, Nihal & Bostanci, Huseyin & Barbieri, Enrique. (2014). Automating a Heat Shrink Tubing Process.

Office Action for U.S. Appl. No. 17/102,178 dated Jan. 6, 2022.

* cited by examiner

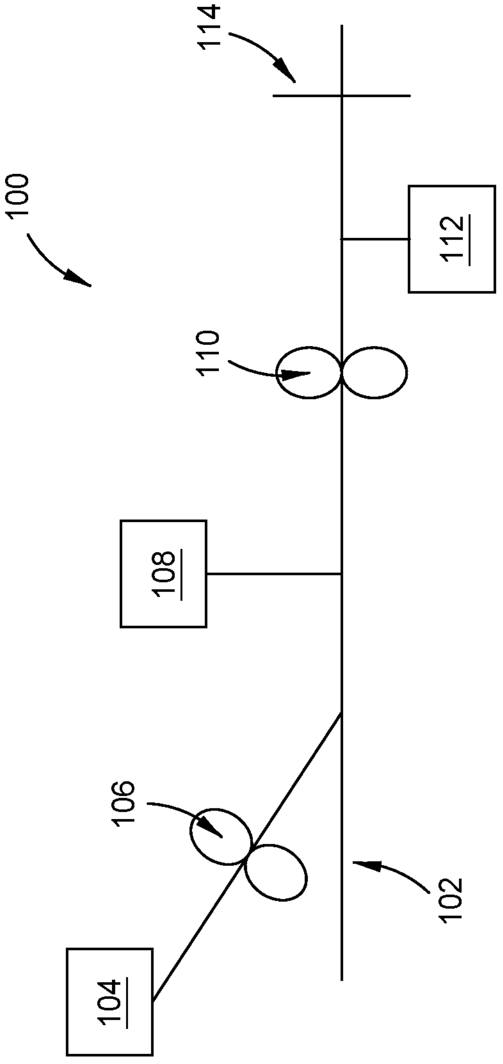
114
100
112
110
108
106
102
104

CABLES AND METHODS THEREOF

CROSS-REFERENCE TO RELATED APPLICATIONS

This application claims benefit of U.S. patent application Ser. No. 17/984,895, filed Nov. 10, 2022 (now issued as U.S. Pat. No. 11,823,814) which claims benefit to U.S. patent application Ser. No. 17/102,178, filed Nov. 23, 2020 (now issued as U.S. Pat. No. 11,508,498) which claims benefit to U.S. Provisional Patent Application No. 62/940,304, filed Nov. 26, 2019. The above-referenced applications are incorporated herein by reference in their entirety.

FIELD

The present disclosure relates to cables and methods of making cables.

BACKGROUND

In recent years, data transmission cables, such as optical fibers, have become the preferred medium in certain applications over copper wire for data transmission, such as telecommunications, particularly high speed communication. There are already millions of miles of data transmission cables, such as optical fibers, in use today, for both long distance hauls, and local distribution within a facility or building. Field installation, service and repair of data transmission cables can be a delicate, time consuming, and often troublesome procedure due to the fragile nature of the components involved. For example, optical fibers are typically made of a material such as quartz, multi-component glass or synthetic resins, and in view of their generally small diameter, such fibers are susceptible to high stresses when undergoing a force exerted in a direction orthogonal to the fiber axis. Optical fibers made of quartz or multi-component glass are liable to break, and those made of synthetic resins are liable to bend or break under such a force. Even a slight bend (microbend) in an optical fiber can result in serious light leakage and consequent signal loss, and small deformations can induce fractures which over time propagate into large cracks.

While there are accordingly many different designs for fiber optic cables, these cables have heavy jacketing materials placed about the optical fibers. Although heavy jacket materials serve the purpose of protecting the cables as they are routed through chases and plenums during the installation, their presence restricts the flexibility of the cables due to the stiffness of the jacket. For example, the stiffness of the outer jacket may prevent convenient routing of these cables to the back plane of a cabinet or face panel. Additionally, the large diameters of these heavy jackets may prevent tight radius routing and mechanical mating of these cables to industry standard connectors. If the outer protective jacket is removed to allow more flexible handling of a terminal portion of the cable, there is insufficient physical protection for this terminal portion.

In addition, for copper-based cables, there is a finite amount of copper available to make the cables, and substantial energy is needed to reclaim the copper from an expired cable. Lastly, conventional methods of making cables often include the use of diluents which must be removed before completing the cable-formation, and residual diluent in the cable hinders electrical properties.

There is a need for improved cables, such as data transmission cables, and methods of making cables.

BRIEF SUMMARY

In at least one embodiment, a method for making a cable includes introducing a conductive material onto a sheet including a heat-shrink material. The method includes compressing a first portion of the sheet onto a second portion of the sheet to form a sheath having an interior volume, where the conductive material is disposed in the interior volume.

In at least one embodiment, a cable includes a sheath including a heat-shrink material. The cable includes an interior volume including a conductive material including a conductive carbon material.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this present disclosure and are therefore not to be considered limiting of its scope, for the present disclosure may admit to other equally effective aspects.

The FIGURE is a schematic diagram of an apparatus used to perform a method of the present disclosure, according to an embodiment.

To facilitate understanding, identical reference numerals have been used, where possible, to designate identical elements that are common to the FIGURES. The FIGURES are not drawn to scale and may be simplified for clarity. It is contemplated that elements and features of one aspect may be beneficially incorporated in other aspects without further recitation.

DETAILED DESCRIPTION

The present disclosure provides methods for making cables. Methods of the present disclosure can provide rapid and low-cost methods for making electrical cables that can be industrially scaled. The present disclosure further provides for cables. Cables of the present disclosure can provide reduced use of copper while maintaining or improving electrical properties and strength, as compared to conventional cables, such as data transmission cables.

Methods for Making Cables

The present disclosure provides methods for making cables. In some embodiments, a method for making a cable includes introducing a conductive material onto a sheet including a heat-shrink material. The method includes compressing a first portion of the sheet onto a second portion of the sheet to form a sheath having an interior volume, where the conductive material is disposed in the interior volume. As used herein, a "conductive material" refers to an electrically conductive material.

The FIGURE is a schematic diagram of an apparatus 100 that may be used to perform a method of the present disclosure. Apparatus 100 includes conveyor 102 which is configured to receive a heat-shrink material from heat-shrink material source 104. Heat-shrink material source 104 includes a spool 106 configured to compress the heat-shrink material into a sheet. Spool 106 can be any suitable spool, such as an extruder. The sheet is disposed onto conveyor 102. Conveyor 106 can have a concave shape for promoting the sheet likewise into a concave shape. For example, conveyor 106 can have a V-shape or U-shape, and the sheet once disposed onto conveyor 106 can likewise have a V-shape or U-shape. The sheet disposed on conveyor 106 is configured to receive conductive material from conductive material source 108. Conductive material source 108 can be any suitable source of conductive material, such as a horizontal oven. Conductive material source 108 can be used to dry and/or form the conductive material. For example, a horizontal oven can use heat to form carbon nanotubes and/or fullerenes from carbon-based starting material(s). One or more additional conductive material source(s) (not shown) may be used to provide one or more additional conductive material(s) and/or filler material(s). Conductive material can be provided to the sheet in powder form or as a solution/dispersion with one or more diluent(s). Diluent(s) may include polymers having electronic/photonic properties, metallic nanoparticles, organic solvents (such as toluene, chloroform, m-cresol, o-cresol or benzene for example), acids (such as hydrochloric acid, sulphuric acid, or chlorosulfonic acid as an example), or combination(s) thereof. After being provided onto the sheet, the diluent(s) can be removed using one or more heaters (not shown) that are configured to evaporate the diluent(s) from the sheet and conductive material. Use of a powder form of the conductive material(s) can render optional the functionalization of the conductive material(s), such as the outer walls, or outer edges, or planar surfaces of a conductive carbon material, thus saving time, resources, and energy that would otherwise be needed to prepare the conductive material(s). Functionalization of conductive carbon material is conventionally performed to promote solvency of the material in a solvent. In addition, avoiding the use of diluents prevents a need to later remove the diluent from the as-formed cable. Diluents present in a cable can negatively affect the electrical conductivity of the cable.

Because processes of the present disclosure can be solvent-free, the process is highly suitable for rapid formation of electrical cables, enabling use of minimal energy and work to create electrical cables. As mentioned above, processes can be performed as a continuous process directly as, for example, nanotubes are manufactured (e.g., in conductive material source 108).

The sheet with the conductive material disposed thereon can be introduced to compressor 110. Compressor 110 can be any suitable compressor such as a hot press roller. A compressor can compress the sheet to form a closed sheet (sheath). For example, a compressor can close the sheet upon itself such that the conductive material is disposed within the closed sheet (sheath). One or more adhesives can be used on one or more sides of the sheet to promote further adhesion upon compression of the sheet to form the sheath. The compression of the sheet to form the sheath can promote contact between the conductive material disposed within the sheath. The compression can be such that the compressed conductive material becomes fabric-like, and the fabric-like material is stronger than the conductive material before compression. Advantageously for industrial scale up, low pressure can be used for compression of the sheet. Low pressure is also advantageous for maintaining the chemical structure of conductive materials such as carbon nanotubes and fullerenes. In some embodiments, a compressor provides a pressure to the sheet of about 10 Newtons or less, such as about 0.1 N to about 1 N.

Heat can also be provided to the sheet and/or sheath. For example, heat can be provided by compressor 110 and/or heat source 112. For example, because the sheath includes heat-shrink material, heat provided to the sheath promotes shrinkage of the sheath around the conductive material and further compression of the conductive material. If compressor 110 is used to provide heat, the heat may be provided concurrently with the pressure to the sheet to form the sheath. In some embodiments, the heat provided to the sheet and/or sheath is a temperature of about 220° C. or less, such as about 50° C. to about 100° C.

After compression and optional heating, the sheath is cut using cutter 114. Cutter can be any suitable cutter, such as a guillotine, hydraulic cutter, mitre saw, band saw, a chop saw, die saw, rotary die cutting machine, or laser cutter. Because methods of the present disclosure can utilize a continuous sheath (e.g., initially provided as a material from source 104), methods of the present disclosure can provide cables having a long contiguous sheath, unlike methods using tubular sheaths. For example, and as described in more detail below, cables of the present disclosure can have a contiguous sheath having a length measured in kilometers.

In addition, because use of a diluent is optional (e.g., solvent is not used), the sheath (comprising heat-shrink material) of a cable of the present disclosure is not prone to bubbling because the presence of volatile diluent in an interior volume (and ultimately the sheath) of the cable has been reduced or eliminated. The reduced or eliminated bubbling provides reduced porosity and increased strength of the sheath such that use of strength-promoting filler material(s) in the sheath and/or interior volume of the cable is likewise reduced or eliminated.

In addition, conductive carbon material is conventionally crosslinked, but this can reduce electrical conductivity of the conductive carbon material. In view of the pressure application of methods of the present disclosure, a conductive carbon material can stick together sufficiently to promote electrical conductivity without a need for chemical modification (e.g., crosslinking) of the conductive carbon material promoting improved electrical conductivity of conventional conductive carbon material. In other words, use of chemically modified conductive carbon material is optional.

Cables

The present disclosure provides for cables. A cable can be any suitable electrical cable, such as a data transmission cable. In some embodiments, a cable includes a sheath including a heat-shrink material. The cable includes an interior volume including a conductive material including a conductive carbon material.

A cable can have a sheath (including a heat-shrink material) and an interior volume. The sheath can have a layer of heat-shrink material and optionally one or more additional layers of additional materials, such as braided wire, conductive carbon wires or braids, or other wire mesh (e.g., a sheath formed using a multilayer sheet provided by source 104 using spool 106 described above), and these wires may be twisted or non-twisted as desired. Conductive material can be present in the interior volume. In addition to providing tight compaction of the conductive material, a sheath (including the heat-shrink material) can protect the conductive material from environmental conditions, such as chemical and/or physical conditions, during use.

Methods of the present disclosure can provide cables having a long contiguous sheath, unlike methods using tubular sheaths. For example, cables of the present disclosure can have a contiguous sheath having a length of about 1 meter or greater, such as about 50 meters or greater, such as about 300 meters or greater, such as 1 kilometer or greater, such as about 1 meter to about 5 kilometers, such as about 300 meters to about 3 kilometers, such as about 400 meters to about 1 kilometer, such as about 500 meters to about 600 meters.

Cables of the present disclosure can be light weight as compared to, for example, a conventional fiber optic cable. For example, a cable can have a density of about 250,000 $g/m^3$ or less, such as about 150,000 $g/m^3$ to about 204,000 $g/m^3$, alternatively about 250,000 $g/m^3$ to about 1,400,000 $g/m^3$, as determined by ASTM D2320-98(2017) Standard Test Method for Density (Relative Density) of Solid Pitch (Pycnometer Method). In addition to providing light weight, conductive carbon material can also provide improved flexibility of a cable, as compared to a conventional fiber optic cable. The improved flexibility provides cables with reduced or eliminated shattering during installation and/or use.

In addition, because use of a diluent is optional (e.g., solvent is not used), the sheath of a cable of the present disclosure is not prone to bubbling because the presence of volatile diluent in an interior volume of the cable has been reduced or eliminated. In some embodiments, a sheath of a cable of the present disclosure can have a porosity of about 1 or less, such as less than about 0.5, such as about 0.5 to about 0.001, as determined by ASTM C830-00(2016) (pore space per unit volume). The reduced or eliminated bubbling provided by methods of the present disclosure provides reduced porosity and increased strength of the sheath such that use of strength-promoting filler material(s) in the sheath and/or interior volume of the cable is likewise reduced or eliminated. For example, a sheath can have a tensile strength of about 150,000 MPa or greater, such as about 150,000 MPa to about 250,000 MPa, alternatively about 250,000 MPa to about 350,000 MPa, as determined by ASTM D638 using type IV tensile bar, compression molded per ASTM D4703 and die cut. The strength of the sheath can be present without compromising flexibility of the sheath/cable.

In some embodiments, an interior volume can have a solids content of about 50% or greater, such as about 60% or greater, such as about 70% or greater, such as about 80% or greater, such as about 90% to about 100%, such as about 95% to about 99%, alternatively about 100%, as determined by ASTM D4404-18.

Cables of the present disclosure may have a substantial weight percent of conductive material, which provides excellent electrical conductivity while still providing a light weight cable. For example, in some embodiments, a cable has a weight ratio of conductive material to heat-shrink material (of the sheath) of about 3 g to about 1 g, such as about 2 g to about 1 g. In at least one embodiment, a cable has a conductive material content of about 25 wt % or greater, such as about 25 wt % to about 35 wt %, such as about 35 wt % to about 45 wt %, based on the weight of the cable. In some embodiments, a cable has a heat-shrink material content of about 75 wt % or greater, such as about 75 wt % to about 85 wt %, based on the weight of the cable.

As mentioned above, the sheath can provide strength such that filler material(s) present in the interior volume of the cable are optional. However, in some embodiments, an interior volume of a cable of the present disclosure has filler material that is an inert filler material. For example, an interior volume can have about 75 wt % to about 100 wt % inert filler material, based on the weight of conductive material+inert filler material. The presence of inert filler material in an interior volume can help to reduce cost of the cable while still allowing sufficient electrical conductivity for the cable's intended use. In some embodiments, an inert filler material is carbon fiber, carbon soot, carbon coke, polymers, or combination(s) thereof.

In some embodiments, an interior volume of a cable of the present disclosure has a combination of conductive carbon material and conductive transition metal material. For example, an interior volume can have about 75 wt % to about 100 wt % conductive carbon material, such as about 85 wt % to about 100 wt %, based on the weight of conductive material+inert filler material (if any). In some embodiments, an interior volume can have about 75 wt % to about 100 wt % conductive transition metal material, such as about 85 wt % to about 100 wt %, based on the weight of conductive material+inert filler material (if any).

A cable of the present disclosure can have an interior diameter of about 2,500 microns or greater, such as about 2,500 microns to about 2,600 millimeters, alternatively about 2,600 microns to about 2,700 millimeters. For example, a cable of the present disclosure used as a data transmission cable may have an interior diameter of about 2,500 microns to about 2,600 millimeters, alternatively about 2,600 microns to about 2,700 millimeters.

A cable of the present disclosure can have an outer diameter of about 2,700 microns or greater, such as about 2,700 microns to about 2,800 millimeters, alternatively about 2,800 microns to about 2,900 millimeters. For example, a cable of the present disclosure used as a data transmission cable may have an outer diameter of about 2,700 microns to about 2,800 millimeters, alternatively about 2,800 microns to about 2,900 millimeters.

A sheath of a cable of the present disclosure can have an average thickness of about 100 microns to about 150 millimeters, alternatively about 150 microns to about 200 millimeters, as determined by ASTM D6988-13.

A cable of the present disclosure can have electrical conductivity with an average resistance of about 35 Ohm to about 200 Ohm, such as about 38.7 Ohm to about 182.8 Ohm.

A cable of the present disclosure can have reduced or eliminated electric arcing or short circuiting during use, as compared to conventional cables.

In addition, a sheath can act as an electrical insulator therefore allowing personnel handling of the cable without fear of electric shock.

In addition, if a conductive material includes a conductive carbon material, methods of present disclosure provide cables that do not require wound yarns of the conductive carbon material, e.g., because a powder conductive carbon material can be used in methods of the present disclosure.

Conductive Material

Conductive material can include any suitable conductive material, such as a conductive carbon material or conductive transition metal material. In some embodiments, a conductive carbon material is carbon black, single-walled carbon nanotubes, multi-walled carbon nanotubes, graphenes, graphites, fullerenes, carbon fibers, or combination(s) thereof. Because there is a finite amount of copper and an overabundance of carbon available for industrial applications, and because reclamation of copper from expired cables is energy intensive, methods and cables of the present disclosure provide substantial or complete replacement of copper in a cable. In other words, the use of copper in a cable of the present disclosure is optional.

Conductive carbon material is conventionally cross-linked, but this can reduce electrical conductivity of the conductive carbon material. In view of the pressure application of methods of the present disclosure, a conductive carbon material can stick together sufficiently to promote electrical conductivity without a need for chemical modification (e.g., crosslinking) of the conductive carbon material. In other words, use of chemically modified conductive carbon material is optional.

As used herein, the term "transition metal" includes post-transition metals, such as aluminum. In some embodiments, a conductive transition metal material includes silver, copper, gold, silver, chromium, palladium, platinum, nickel, gold or silver-coated nickel, aluminum, indium tin oxide, silver coated copper, silver coated aluminum, antimony doped tin oxide, aluminum, alloy(s) thereof, or combination(s) thereof. In some embodiments, a conductive transition metal material is copper, gold, silver, chromium, aluminum and alloy(s) thereof, or combination(s) thereof.

The conductive material can be in the form of particles (e.g., spherical particles). The particles can have an average length of about 10 nm to about 10 millimeter. The conductive material can be in the form of fibers. The fibers can have an average aspect ratio of about 1 to about 2 million. Aspect ratio is the average length divided by the average width. The fibers can have an average length of about 50 nm to about 250 microns, and/or an average width of about 5 nm to about 25 microns.

The conductive material can be in the form of powder, and after pressure application, the conductive material is condensed to form a compacted material. The compacted material promotes electrical communication between the particles of conductive material.

Carbon Nanotubes

The conductive material can include a carbon nanotube, such as a single-wall carbon nanotube (SWNT) or a multi-walled carbon nanotube (MWNT). A carbon nanotube is a carbon structure in which honeycomb patterns, with interlocking hexagons of six carbons, are bonded to have a tube shape. A carbon nanotube has excellent mechanical properties, heat resistance, chemical resistance, and the like.

A carbon nanotube may have a diameter of several nanometers or several tens of nm and a length of several tens of mm or greater, and as a result has a large aspect ratio. For example, the carbon nanotube may have an aspect ratio (ratio of length/diameter) of about 25 to about 5,000, such as about 200 to about 5,00.

A carbon nanotube may have a diameter of about 1 nm to about 50 nm, such as about 5 to about 20 nm, such as about 8 nm to about 15 nm, and the length of about 10 μm to about 120 μm, such as about 10 μm to about 100 μm, such as about 10 μm to about 70 μm.

In some embodiments, a carbon nanotube has a Brunauer-Emmett-Teller (BET) specific surface area of about 1,315 $m^2/g$ or more, or about 1,315 $m^2/g$ to about 1,415 $m^2/g$, alternatively about 1,415 to about 1,515 $m^2/g$. The BET specific surface area can be measured using a BET analyzer.

Single-Walled Carbon Nanotube

Conductive material can include a single-walled carbon nanotube (SWNT). SWNTs may include any of two, at least two, three, at least three, four, and at least four types of SWNTs. A SWNT includes a hollow carbon fiber having essentially a single layer of carbon atoms forming the wall of the fiber. A SWNT may be considered as including a single-layered graphene sheet. A SWNT comprises a crystalline tubular form of carbon.

The average diameter of the SWNT may be about 0.8 nm to about 50 nm, such as about 1 nm to about 40 nm, such as about 2 nm to about 30 nm, such as about 3 nm to about 20 nm, such as about 5 nm to about 10 nm, alternatively about 10 nm to about 20 nm. The ratio of average tube length of SWNT to the average diameter of the SWNT may be about 3 to about 10,000, such as about 5 to about 5,000, such as about 100 to about 500, alternatively about 500 to about 1,000, alternatively about 5 to about 100.

SWNTs, and methods of making SWNTs, are known. See, for example, U.S. Pat. Nos. 5,424,054; 5,753,088; 6,063,243; 6,331,209; 6,333,016; 6,413,487; 6,426,134; 6,451,175; 6,455,021; 6,517,800; U.S. Patent Publication 2002/0122765 A1; each of which is incorporated herein by reference.

At least a portion of SWNTs may be functionalized (e.g., derivatized), for example, functionalized with PVOH- or EVOH-containing copolymers.

Multi-Walled Carbon Nanotube

Conductive material can include a multi-walled carbon nanotube (MWNT). MWNTs have multiple concentric rolled layers of graphene tubes. The interlayer distance in MWNT is close to the distance between graphene layers in graphite of approximately 3.4 Angstroms.

The average diameter of a MWNT may be about 10 nm to about 400 nm, such as about 10 nm to about 100 nm, alternatively about 100 nm to about 200 nm, alternatively about 200 nm to about 300 nm, alternatively about 300 nm to about 400 nm. The ratio of average tube length of a MWNT to the average diameter of the MWNT material may be about 3,000,000 to about 300,000, such as about 300,000 to about 150,000, alternatively about 100,000 to about 75,000.

MWNTs, and methods of making MWNTs, are known. See, for example, U.S. Pat. Nos. 4,663,230; 7,244,408; 5,346,683; 5,747,161; 7,195,780, 7,615,204, each of which is incorporated herein by reference.

At least a portion of MWNT material may be functionalized (e.g., derivatized), for example, functionalized with PVOH- or EVOH-containing copolymers.

Graphene

Graphene is the term for a modification of carbon having a two-dimensional structure in which each carbon atom is surrounded by three further carbon atoms so as to form a honeycomb-like pattern. Graphene is closely related structurally to graphite which can be thought of as a plurality of superposed graphenes. Graphene can be obtained in relatively large quantities by exfoliation of graphite (splitting into the basal planes). For this purpose, oxygen can be intercalated into the graphite lattice, and this then reacts partially with the carbon and brings about intrinsic repulsion of the layers.

Graphene may be single-layer graphene sheets or multi-layer graphene sheets. A single-layer graphene sheet is composed of carbon atoms occupying a two-dimensional hexagonal lattice. Multi-layer graphene is a platelet composed of more than one graphene plane. Graphene can include pristine graphene (e.g., about 99% or greater carbon atoms), slightly oxidized graphene (e.g., about 5% or less by weight of oxygen), graphene oxide (greater than about 5% of oxygen), slightly fluorinated graphene (about 5% by weight or less of fluorine), graphene fluoride (greater than 5% by weight of fluorine), other halogenated graphene, or other chemically functionalized graphene.

Graphenes, and methods of making graphenes are known. See, for example, U.S. Pat. Pub. Nos. 2019/0345344; U.S. Pat. Nos. 10,826,109; 10,822,239; 10,822,238; 10,777,406; 10,773,954, each of which is incorporated herein by reference.

Single layer graphene is a two-dimensional material, and is a single layer of graphite. As used herein, more than one layer of graphene can be referred to as graphene, for example between 1 and 200 layers (e.g., about 1 to 100 layers, about 1 to 50 layers, about 1 to 10 layers).

Graphite

Graphite particles may have an average diameter of about 0.1 μm to about 50 μm, such as about 1 μm to about 30 μm.

Graphites, and methods of making graphites, are known. See, for example, U.S. Pat. Nos. 9,499,408B2; 10,322,935; 10,336,620; 10,266,942; 10,167,198, each of which is incorporated herein by reference.

Fullerenes

Fullerenes are spherical or partially spherical aromatic compounds having triconjugate ($Sp^2$-hybridized) carbon atoms. In general, fullerenes have a pentagonal or hexagonal arrangement of the carbon atoms. The carbon atoms are each bonded to three adjacent carbon atoms.

In some embodiments, fullerenes include a $C_{60}$, $C_{70}$, $C_{76}$, $C_{78}$, $C_{84}$, $C_{100}$, or combination(s) thereof.

Fullerenes can be chemically or physically modified, such as fluorinated fullerenes or adducts or derivatives (such as, for example, those described in Cardulla et al., Helv. Chim. Acta 80:343-371, 1997; Zhou et al., J. Chem. Soc., Perkin Trans. 2:1-5, 1997; Okino et al., Synth. Metals 70:1447-1448, 1995; Okino et al., Recent Advances in the Chemistry and Physics of Fullerenes and Related Materials, vol. 3, 1996, pp. 191-199; Haddon et al., Nature 350:320-322, 1991; Chabre et al., J. Am. Chem. Soc. 114:764-766, 1992; Gromov et al., Chem. Commun. 2003-2004, 1997; Strasser et al., J. Phys. Chem. B 102:4131-4134, 1998; Cristofolini et al., Phys. Rev. B: Cond. Matter Mater. Phys. 59:8343-8346, 1999; Wang et al., Synthetic Metals 103(1):2350-2353, 1999; Wang et al., Mater. Res. Soc. Symp. Proc. 413:571, 1996; Kallinger et al., Synthetic Metals 101:285-286, 1999; Kajii et al., Synthetic Metals 86:2351-2352, 1997; and Araki et al., Synthetic Metals 77:291-298, 1996), as well as polymeric, copolymeric or crosslinked fullerenes.

In fullerenes, comparable to metals, one free electron per carbon atom is present due to the molecular structure. As a result, an electrical conductivity on the order of metallic conductivities is observed for fullerenes. The conductivity of fullerenes may even be up to five times higher than the conductivity of copper.

Generally, fullerenes may be synthesized according to any suitable method, such as the carbon arc method (also referred to as the Kratschmer-Huffman method) and purified by any suitable method, such as slow concentration of solutions, diffusion methods, cooling of saturated solutions, precipitation with a solvent, sublimation, electrochemically, by liquid chromatographic separation, and the purification may be performed in an inert atmosphere.

Fullerenes, and methods of making fullerenes, are known. See, for example, U.S. Pat. Pub. Nos. 2004/0091783; 2007/0048209; U.S. Pat. Nos. 5,876,684; 6,855,231; 7,632,569; 5,851,503; 7,655,302, each of which is incorporated herein by reference.

Carbon Fibers, Carbon Nanofibers and Vapor Grown Carbon Fibers

Carbon fiber is part of the graphite allotrope of carbon materials, and it is an elongated form with fibrous dimensions of high aspect ratio made predominantly of $sp^2$ carbon atoms arranged in a honeycomb lattice. Carbon fibers can be of nano vector dimensions and are known as carbon nanofibers. Nanofibers can have tubular orientation that can have fishbone structure. Carbon nanofibers may be contiguous materials or can be made as particles. Carbon fibers can be made from polyacrylonitrile and are known as PAN-carbon fiber. Carbon fibers can also be made from crude oil derivates and are then known as pitch carbon fibers. Carbon fibers are used for high strength additives to structural materials and are also used due to their electrical conduction properties.

Carbon fibers can be made in the vapor state and are known as vapor grown carbon fibers. Carbon fibers and carbon nanofibers can have a diameter of about 100 nm to about 10 microns. Carbon fibers can have a length of about 100 nm to about 1 mm. Carbon nanofibers were first made in 1879 by Thomas Edison using cotton and bamboo. But are commonly made using aromatic hydrocarbons in the presence of a transition metal catalyst such as iron or with an organo transition metal compounds such as ferrocene (such as, for example, those described in Orbaek et al J. Mater. Chem. A, 1:14122-14132, 2013; Bhatt, P. & Goe, A. Mater. Sci. Res. India 14:52-57, 2017; Feng, L., et al. Materials (Basel). 7:3919-3945, 2014).

Vapor grown carbon fibers and methods of making vapor grown carbon fibers are known. See, for example, U.S. Pat. Pub. Nos. U.S. Pat. Nos. 6,969,503; 7,122,132; 7,524,479; 7,527,779; 7,846,415; 8,206,678; 9,126,837; 6,506,355 each of which is incorporated herein by reference.

Heat-Shrink Material

The heat-shrink material may include one or more thermoplastic polymers, for example, polyolefins (e.g., polyethylene, polypropylene), ethylene/vinyl alcohol copolymers, ionomers, vinyl plastics (e.g., polyvinyl chloride, polyvinylidene chloride), polyamide, polyester, or combination(s) thereof. The heat-shrink material may include one or more thermoplastic polymers in an amount of about 100 wt %, based on the weight of the heat-shrink material. Alternatively, the heat-shrink material may include one or more thermoplastic polymers in an amount of about 30 wt % to about 99 wt %, such about 40 wt % to about 97 wt %, such as about 45 wt % to about 75 wt %, such as about 50 wt % to about 70 wt %, such as about 55 wt % to about 65 wt %, alternatively about 80 wt % to about 95 wt %, such as about 85 wt % to about 90 wt %, based on the weight of the heat-shrink material.

Polyolefins

Example polyolefins can include ethylene homo- and co-polymers and propylene homo- and co-polymers. The term "polyolefins" includes copolymers that contain at least 50 weight % monomer units derived from olefin. Ethylene homopolymers include high density polyethylene ("HDPE") and low density polyethylene ("LDPE"). Ethylene copolymers include ethylene/alpha-olefin copolymers ("EAOs"), ethylene/unsaturated ester copolymers, and ethylene/(meth)acrylic acid. ("Copolymer" as used herein means a polymer derived from two or more types of monomers, and includes terpolymers, etc.)

EAOs are copolymers of ethylene and one or more alpha-olefins, the copolymer having ethylene as the majority mole-percentage content. The comonomer may include one or more $C_3$-$C_{20}$ α-olefins, one or more $C_4$-$C_{12}$ α-olefins, and one or more $C_4$-$C_8$ α-olefins. α-olefins include, but are not limited to, 1-butene, 1-hexene, 1-octene, and mixtures thereof.

EAOs can include one or more of the following: 1) medium density polyethylene ("MDPE"), for example having a density of from 0.926 to 0.94 g/cm$^3$; 2) linear medium density polyethylene ("LMDPE"), for example having a density of from 0.926 to 0.94 g/cm$^3$; 3) linear low density polyethylene ("LLDPE"), for example having a density of from 0.915 to 0.930 g/cm$^3$; 4 very-low or ultra-low density polyethylene ("VLDPE" and "ULDPE"), for example having density below 0.915 g/cm$^3$, and/or 5) homogeneous EAOs. Unless otherwise indicated, densities of EAOs are measured according to ASTM D1505.

The polyethylene polymers may be either heterogeneous or homogeneous. Heterogeneous polymers have a relatively wide variation in molecular weight and composition distribution. Heterogeneous polymers may be prepared with, for example, conventional Ziegler-Natta catalysts.

On the other hand, homogeneous polymers are typically prepared using metallocene or other single-site catalysts. Homogeneous polymers are structurally different from heterogeneous polymers in that homogeneous polymers exhibit a relatively even sequencing of comonomers within a chain, a mirroring of sequence distribution in all chains, and a similarity of length of all chains. As a result, homogeneous polymers have relatively narrow molecular weight and composition distributions. Examples of homogeneous polymers include the metallocene-catalyzed linear homogeneous ethylene/alpha-olefin copolymer resins available from the ExxonMobil Chemical Company (Baytown, Tex.) under the EXACT trademark, linear homogeneous ethylene/alpha-olefin copolymer resins available from the Mitsui Petrochemical Corporation under the TAFMER trademark, and long-chain branched, metallocene-catalyzed homogeneous ethylene/alpha-olefin copolymer resins available from the Dow Chemical Company under the AFFINITY trademark.

Another useful ethylene copolymer is ethylene/unsaturated ester copolymer, which is the copolymer of ethylene and one or more unsaturated ester monomers. Useful unsaturated esters include: 1) vinyl esters of aliphatic carboxylic acids, where the esters have from 4 to 12 carbon atoms, and 2) alkyl esters of acrylic or methacrylic acid (collectively, "alkyl (meth)acrylate"), where the esters have from 4 to 12 carbon atoms.

Representative examples of the first ("vinyl ester") group of monomers may include vinyl acetate, vinyl propionate, vinyl hexanoate, vinyl 2-ethylhexanoate, or combination(s) thereof. The vinyl ester monomer may have from 4 to 8 carbon atoms, from 4 to 6 carbon atoms, from 4 to 5 carbon atoms, such as 4 carbon atoms.

Representative examples of the second ("alkyl (meth) acrylate") group of monomers may include methyl acrylate, ethyl acrylate, isobutyl acrylate, n-butyl acrylate, hexyl acrylate, 2-ethylhexyl acrylate, methyl methacrylate, ethyl methacrylate, isobutyl methacrylate, n-butyl methacrylate, hexyl methacrylate, 2-ethylhexyl methacrylate, or combination(s) thereof. The alkyl (meth)acrylate monomer may have from 4 to 8 carbon atoms, from 4 to 6 carbon atoms, and preferably from 4 to 5 carbon atoms.

The unsaturated ester (i.e., vinyl ester or alkyl (meth) acrylate) comonomer content of the ethylene/unsaturated ester copolymer can be about 6 wt % to about 18 wt %, such as about 8 wt % to about 12 wt %, based on the weight of the copolymer. Ethylene contents of the ethylene/unsaturated ester copolymer may be about 82 wt % to about 94 wt %, such as about 85 wt % to about 93 wt %, such as about 88 wt % to about 92 wt %, based on the weight of the copolymer.

Representative examples of ethylene/unsaturated ester copolymers include ethylene/methyl acrylate, ethylene/methyl, methacrylate, ethylene/ethyl acrylate, ethylene/ethyl methacrylate, ethylene/butyl acrylate, ethylene/2-ethylhexyl methacrylate, and ethylene/vinyl acetate.

Another useful ethylene copolymer is ethylene/(meth) acrylic acid, which is the copolymer of ethylene and acrylic acid, methacrylic acid, or both.

Propylene copolymer includes propylene/ethylene copolymers ("EPC"), which are copolymers of propylene and ethylene having a majority wt % content of propylene, such as those having an ethylene comonomer content of about 2 wt % to about 10 wt %, such as about 3 wt % to about 6 wt %.

Ethylene/Vinyl Alcohol Copolymer

Ethylene/vinyl alcohol copolymer ("EVOH") is another useful thermoplastic. EVOH may have an ethylene content of about 20 wt % to about 40 wt %, such as about 25 wt % to about 35 wt %, such as about 30 wt % to about 33 wt %, such as about 32 wt %.

Ionomer

A thermoplastic may be an ionomer, which is a copolymer of ethylene and an ethylenically unsaturated monocarboxylic acid having the carboxylic acid groups partially neutralized by a metal ion, such as sodium or zinc. Ionomers may include those in which sufficient metal ion is present to neutralize from about 10% to about 60% of the acid groups in the ionomer. The carboxylic acid may be "(meth)acrylic acid"—which means acrylic acid and/or methacrylic acid. Useful ionomers include those having at least 50 weight % and preferably at least 80 weight % ethylene units. Useful ionomers also include those having from 1 to 20 weight percent acid units. Useful ionomers are available, for example, from Dupont Corporation (Wilmington, Del.) under the SURLYN trademark.

Vinyl Plastics

Useful vinyl plastics include polyvinyl chloride ("PVC"), vinylidene chloride polymer ("PVdC"), and polyvinyl alcohol ("PVOH"). Polyvinyl chloride ("PVC") refers to a vinyl chloride-containing polymer or copolymer—that is, a polymer that includes at least 50 weight percent monomer units derived from vinyl chloride ($CH_2{=}CHCl$) and also, optionally, one or more comonomer units, for example, derived from vinyl acetate. One or more plasticizers may be compounded with PVC to soften the resin and/or enhance flexibility and processibility.

Another exemplary vinyl plastic is vinylidene chloride polymer ("PVdC"), which refers to a vinylidene chloride-containing polymer or copolymer—that is, a polymer that includes monomer units derived from a vinylidene, such as vinylidene chloride ($CH_2{=}CCl_2$), and also, optionally, monomer units derived from one or more of vinyl chloride, styrene, vinyl acetate, acrylonitrile, $C_1$-$C_{12}$ alkyl esters of (meth)acrylic acid (e.g., methyl acrylate, butyl acrylate, methyl methacrylate), or combination(s) thereof. As used herein, "(meth)acrylic acid" refers to both acrylic acid and/or methacrylic acid; and "(meth)acrylate" refers to both acrylate and methacrylate. Examples of PVdC include one or more of the following: vinylidene chloride homopolymer, vinylidene chloride/vinyl chloride copolymer ("VDC/VC"), vinylidene chloride/methyl acrylate copolymer, vinylidene chloride/ethyl acrylate copolymer, vinylidene chloride/ethyl methacrylate copolymer, vinylidene chloride/methyl methacrylate copolymer, vinylidene chloride/butyl acrylate copolymer, vinylidene chloride/styrene copolymer, vinylidene chloride/acrylonitrile copolymer, and/or vinylidene chloride/vinyl acetate copolymer.

PVdC may have 75 wt % to about 98 wt %, such as about 80 wt % to about 95 wt %, vinylidene chloride monomer, based on the weight of the PVdC. PVdC may have about 5 wt % to about 25 wt %, such as about 15 wt % to about 20 wt % comonomer, based on the weight of the PVdC.

PVdC may have a weight-average molecular weight (Mw) of about 10,000 g/mol to about 180,000 g/mol, such as about 50,000 g/mol to about 170,000 g/mol, such as about 100,000 g/mol to about 150,000 g/mol, such as about 120,000 g/mol to about 140,000 g/mol, as determined by gel permeation chromatography. PVdC may have a viscosity-average molecular weight (Mz) of about 130,000 g/mol to about 300,000 g/mol, such as 170,000 g/mol to about 250,000 g/mol, as determined by gel permeation chromatography.

Polyamide

Polyamides may include those of the type formed by the polycondensation of one or more diamines with one or more diacids and/or of the type that may be formed by the polycondensation of one or more amino acids. Polyamides may include aliphatic polyamides and/or aliphatic/aromatic polyamides.

Representative aliphatic diamines for making polyamides include those having the formula:

$$H_2N(CH_2)_nNH_2$$

where n has an integer value of 1 to 16. Representative examples include trimethylenediamine, tetramethylenediamine, pentamethylenediamine, hexamethylenediamine, octamethylenediamine, decamethylenediamine, dodecamethylenediamine, hexadecamethylenediamine. Representative aromatic diamines include p-phenylenediamine, 4,4'-diaminodiphenyl ether, 4,4' diaminodiphenyl sulphone, 4,4'-diaminodiphenylethane, or combination(s) thereof. Representative alkylated diamines include 2,2-dimethylpentamethylenediamine, 2,2,4-trimethylhexamethylenediamine, 2,4,4-trimethylpentamethylenediamine, or combination(s) thereof. Representative cycloaliphatic diamines include diaminodicyclohexylmethane. Other useful diamines include heptamethylenediamine, nonamethylenediamine, or combination(s) thereof.

Representative diacids for making polyamides include dicarboxylic acids, which may be represented by the formula:

$$HOOC—Z—COOH$$

where Z is representative of a divalent aliphatic or cyclic group containing at least 2 carbon atoms. Representative examples include aliphatic dicarboxylic acids, such as adipic acid, sebacic acid, octadecanedioic acid, pimelic acid, suberic acid, azelaic acid, dodecanedioic acid, and glutaric acid; and aromatic dicarboxylic acids, such as such as isophthalic acid and terephthalic acid, or combination(s) thereof.

The polycondensation reaction product of one or more diamines with one or more diacids may form useful polyamides. Representative polyamides of the type that may be formed by the polycondensation of one or more diamines with one or more diacids may include aliphatic polyamides such as poly(hexamethylene adipamide) ("nylon-6,6"), poly (hexamethylene sebacamide) ("nylon-6,10"), poly(heptamethylene pimelamide) ("nylon-7,7"), poly(octamethylene suberamide) ("nylon-8,8"), poly(hexamethylene azelamide) ("nylon-6,9"), poly(nonamethylene azelamide) ("nylon-9, 9"), poly(decamethylene azelamide) ("nylon-10,9"), poly (tetramethylenediamine-co-oxalic acid) ("nylon-4,2"), the polyamide of n-dodecanedioic acid and hexamethylenediamine ("nylon-6,12"), the polyamide of dodecamethylenediamine and n-dodecanedioic acid ("nylon-12,12"), or combination(s) thereof.

Representative aliphatic/aromatic polyamides include poly(tetramethylenediamine-co-isophthalic acid) ("nylon-4, I"), polyhexamethylene isophthalamide ("nylon-6,I"), polyhexamethylene terephthalamide ("nylon-6,T"), poly (2,2,2-trimethyl hexamethylene terephthalamide), poly(m-xylylene adipamide) ("nylon-MXD,6"), poly(p-xylylene adipamide), poly(hexamethylene terephthalamide), poly(dodecamethylene terephthalamide), or combination(s) thereof.

Representative polyamides of the type that may be formed by the polycondensation of one or more amino acids may include poly(4-aminobutyric acid) ("nylon-4"), poly(6-aminohexanoic acid) ("nylon-6" or "poly(caprolactam)"), poly (7-aminoheptanoic acid) ("nylon-7"), poly(8-aminooctanoic acid) ("nylon-8"), poly(9-aminononanoic acid) ("nylon-9"), poly(10-aminodecanoic acid) ("nylon-10"), poly(11-aminoundecanoic acid) ("nylon-11"), and poly(12-aminododecanoic acid) ("nylon-12"), or combination(s) thereof.

Representative copolyamides may include copolymers based on a combination of the monomers used to make any of the foregoing polyamides, such as, nylon-4/6, nylon-6/6, nylon-6/9, nylon-6/12, caprolactam/hexamethylene adipamide copolymer ("nylon-6,6/6"), hexamethylene adipamide/caprolactam copolymer ("nylon-6/6,6"), trimethylene adipamide/hexamethylene azelaiamide copolymer ("nylon-trimethyl 6,2/6,2"), hexamethylene adipamide-hexamethylene-azelaiamide caprolactam copolymer ("nylon-6,6/6,9/6"), hexamethylene adipamide/hexamethylene-isophthalamide ("nylon-6,6/6,1"), hexamethylene adipamide/hexamethyleneterephthalamide ("nylon-6,6/6, T"), nylon-6,T/6,I, nylon-6/MXD,T/MXD,I, nylon-6,6/6,10, nylon-6,I/6,T, or combination(s) thereof.

Polyamide copolymers may include the most prevalent polymer unit in the copolymer (e.g., hexamethylene adipamide as a polymer unit in the copolymer nylon-6,6/6) of about 50 wt % to about 99 wt %, such as about 60 wt % to about 90 wt %, such as about 80 wt % to about 90 wt %, based on the weight of the polymer. Polyamide copolymers may include the second most prevalent polymer unit in the copolymer (e.g., caprolactam as a polymer unit in the copolymer nylon-6,6/6) of about 1 wt % to about 50 wt %, such as about 20 wt % to about 40 wt %, such as about 30 wt % to about 40 wt %, alternatively about 1 wt % to about 10 wt %, based on the weight of the polymer.

Polyesters

Polyesters may include those made by: 1) condensation of polyfunctional carboxylic acids with polyfunctional alcohols, 2) polycondensation of hydroxycarboxylic acid, and 3) polymerization of cyclic esters (e.g., lactone).

Exemplary polyfunctional carboxylic acids (and their derivatives such as anhydrides or simple esters like methyl esters) include aromatic dicarboxylic acids and derivatives (e.g., terephthalic acid, isophthalic acid, dimethyl terephthalate, dimethyl isophthalate) and aliphatic dicarboxylic acids and derivatives (e.g., adipic acid, azelaic acid, sebacic acid, oxalic acid, succinic acid, glutaric acid, dodecanoic diacid, 1,4-cyclohexane dicarboxylic acid, dimethyl-1,4-cyclohexane dicarboxylate ester, dimethyl adipate, or combination(s) thereof). Dicarboxylic acids may include those discussed above in the polyamide section. Polyesters may be produced using anhydrides and esters of polyfunctional carboxylic acids.

Exemplary polyfunctional alcohols include dihydric alcohols (and bisphenols) such as ethylene glycol, 1,2-propanediol, 1,3-propanediol, 1,3-butanediol, 1,4-butanediol, 1,4-cyclohexanedimethanol, 2,2-dimethyl-1,3-propanediol, 1,6-hexanediol, poly(tetrahydroxy-1,1'-biphenyl, 1,4-hydroquinone, bisphenol A, or combination(s) thereof.

Exemplary hydroxycarboxylic acids and lactones include 4-hydroxybenzoic acid, 6-hydroxy-2-naphthoic acid, pivalolactone, caprolactone, or combination(s) thereof.

Useful polyesters include homopolymers and copolymers. These may be derived from one or more of the constituents discussed above. Exemplary polyesters include poly(ethylene terephthalate) ("PET"), poly(butylene terephthalate) ("PBT"), and poly(ethylene naphthalate) ("PEN"). If the polyester includes a mer unit derived from terephthalic acid, then such mer content (mole %) of the diacid of the polyester may be at least about 70%, 75%, 80%, 85%, 90%, or 95%.

The polyester (e.g., copolyester) may be amorphous, or may be partially crystalline (semi-crystalline), such as having a crystallinity of about 10% to about 50%, such as about 15% to about 40%, such as about 20% to about 30%.

Optional Energy Treatment

The heat-shrink material may be crosslinked, for example, to improve the strength of the heat-shrink material. Crosslinking may be achieved by using chemical additives or by subjecting the heat-shrink material to one or more energetic radiation treatments—such as ultraviolet, X-ray, gamma ray, beta ray, high energy electron beam treatment, or combination(s) thereof—to induce crosslinking between molecules of the irradiated material. Radiation dosages may be about 5 kGy (kiloGRay) to about 150 kGy, such as about 10 kGy to about 130 kGy, such as about 20 kGy to about 100 kGy, such as about 40 kGy to about 80 kGy, such as about 60 kGy to about 70 kGy.

The crosslinking may occur before or after applying pressure and/or to the heat-shrink material to form the sheath of methods of the present disclosure, for example, to enhance the film strength and/or promote heat shrinking.

Additional Aspects

The present disclosure provides, among others, the following aspects, each of which may be considered as optionally including any alternate aspects.

Clause 1. A method for making a cable, comprising:
- introducing a conductive material onto a sheet comprising a heat-shrink material; and
- compressing a first portion of the sheet onto a second portion of the sheet to form a sheath having an interior volume, wherein the conductive material is disposed in the interior volume.

Clause 2. The method of Clause 1, wherein the sheet has a concave shape.

Clause 3. The method of Clauses 1 or 2, wherein the concave shape is a V-shape or U-shape.

Clause 4. The method of any of Clauses 1 to 3, wherein the method is performed using an apparatus comprising an oven and a conveyor, the method further removing the conductive material from the oven before introducing the conductive material onto the sheet, wherein the sheet is disposed on the conveyor.

Clause 5. The method of any of Clauses 1 to 4, wherein:
- the conductive material comprises a carbon nanotube, a fullerene, or combination(s) thereof, and
- the oven forms the carbon nanotube or the fullerene using a carbon-based starting material.

Clause 6. The method of any of Clauses 1 to 5, wherein the conductive material is a powder when introduced to the sheet.

Clause 7. The method of any of Clauses 1 to 6, wherein compressing is performed using a hot press roller.

Clause 8. The method of any of Clauses 1 to 7, wherein compressing is performed by providing a pressure to the sheet of about 0 N to about 45 N, as determined by ASTM D854-14.

Clause 9. The method of any of Clauses 1 to 8, further comprising heating the sheet or sheath.

Clause 10. The method of any of Clauses 1 to 9, wherein compressing and heating are each performed using a hot press roller.

Clause 11. The method of any of Clauses 1 to 10, wherein heating is performed at a temperature of about 180° C. to about 220° C.

Clause 12. The method of any of Clauses 1 to 11, further comprising cutting the sheath to form the cable.

Clause 13. A cable, comprising:
- a sheath comprising a heat-shrink material; and
- an interior volume comprising a conductive carbon material.

Clause 14. The cable of Clause 13, wherein the sheath is a contiguous sheath having a length of about 50 meters or greater.

Clause 15. The cable of Clauses 13 or 14, wherein the length is about 1 kilometer or greater.

Clause 16. The cable of any of Clauses 13 to 15, wherein the cable has a density of about 204,000 $g/m^3$ or less.

Clause 17. The cable of any of Clauses 13 to 16, wherein the sheath has a porosity of about 0 to about 1, as determined by ASTM C830-00(2016).

Clause 18. The cable of any of Clauses 13 to 17, wherein the sheath has a tensile strength of about 150,000 MPa to about 350,000 MPa, as determined by ASTM D638 using type IV tensile bar, compression molded per ASTM D4703 and die cut.

Clause 19. The cable of any of Clauses 13 to 18, wherein the interior volume has a solids content of about 90% to about 99%, as determined by ASTM C1039-85(2019).

Clause 20. The cable of any of Clauses 13 to 19, wherein the cable has a weight ratio of the conductive carbon material to the heat-shrink material of about 3 to about 1.

Clause 21. The cable of any of Clauses 13 to 20, wherein the cable has a conductive carbon material content of about 75 wt % to about 100 wt %, based on weight of the cable.

Clause 22. The cable of any of Clauses 13 to 21, wherein the cable has a heat-shrink material content of about 75 wt % to about 100 wt %, based on weight of the cable.

Clause 23. The cable of any of Clauses 13 to 22, wherein the conductive carbon material is selected from the group consisting of a single-walled carbon nanotube, a multi-walled carbon nanotube, a fullurene, or combination(s) thereof.

Clause 24. The cable of any of Clauses 13 to 23, wherein the interior volume further comprises conductive transition metal material.

Clause 25. The cable of any of Clauses 13 to 24, wherein the transition metal material comprises copper, iron, silver, gold, chromium, aluminum, or combination(s) thereof.

Examples

Example 1. An 80 mm long (2.5 mm in internal diameter before heat-shrink) of shrink tube was used in a production of carbon nanotube powder cable. Firstly, one end of the shrink tube was tightly clipped with a blinder clip. The shrink wrap was then filled with 0.32 g carbon nanotube powder (assumed that the mass density of carbon nanotube powder=1.6 g cm-3) by a spatula one at a time, with assistance of a stick (<2.5 mm in diameter) to push the CNTs powder inwards solidly to the clipped end of shrink wrap. After the shrink wrap was filled with carbon nanotube powder, the other end of the shrink wrap was also clipped with a blinder clip. A hot iron (temperature range 100° C.-200° C.) was placed on top of the shrink wrap evenly, until the whole shrink wrap was shrunk from 2.5 mm to 1.25 mm in diameter. Subsequently, the blinder clips were removed and the copper cables were inserted at both ends. Finally, the remaining unshrunk wrap was ironed and wrapped with electrical tape at both openings. The resistance of the CNT cable 1 was measured to be 66.9 (Ohm).

Example 2. The procedure explained in Example 1 was followed except that CNTs were added to a value less than 0.32 g. The electrical resistance of cable 2 was measured to be 71.5 (Ohm) respectively.

Example 3. An 80 mm long (2.5 mm in internal diameter before heatshrink) of shrink tube and an 80 mm long (3 mm in internal diameter before heat-shrink) was used in a production of carbon nanotube bucky paper cable. Firstly, the 2.5 mm diameter Shrink tube was cut in half horizontally by scissors. The inner of shrink wrap was then overlaid with several Buckypaper strips (2.5 mm inch width, 20 mm in length=5 Buckypapers in total) with tweezers. Then, the 3 mm diameter shrink tube was inserted around the existing 2.5 mm diameter tube. The copper cables were also attached to both ends of the shrink tubes. A hot iron (temperature range 100° C.-200° C.) was placed on top of the shrink wrap until the whole shrink wrap was shrunk from 2.5 mm to 1.25 mm in diameter. Finally, wrapping the shrink wraps with electrical tape at both openings.

Example 4. At the ends of the carbon nanotube cables, a piece of copper wire was inserted at the ends of the heat-shrink tubing prior to shrinking the tubing. Therefore, an intimate contact at either end of the carbon nanotube cable with the copper wiring was made.

Example 5. Following Example 4, the carbon nanotube electrical wires, having copper wire contacts were used to convert electrical signals to an audio sound. To do this, they were connected to 3.5 mm headphone jacks using three CNT cables to be the left, right, and neutral leads used for carrying electrical data signals. The ends being copper wire were easily soldered to the commercial 3.5 mm headphone jacks. The headphone jacks were then placed in the headphone slot of an audio transmission device, such as a mobile phone, while the other 3.5 mm headphone jack was placed in the slot of a speaker system. Once music was played from the audio transmission device, the speaker system operated normally. In this way the CNT cables were shown to work as data transmission cables by way of sending audio signals from a transmitter to a speaker set.

Example 6. Following Example 4, the carbon nanotubes electric wires having copper wire contact were used to transmit data signals between two RJ45 plugs. These plugs, and wires, were used as a comparison to an Ethernet cable to transmit signals from a modem to a laptop computer. Using an online internet speed testing website the data transfer was measured ten times to determine the average and range of upload and download speeds. The average download speed was 9.19 Mb/s with a maximum of 9.30 Mb/s and a minimum of 9.04 Mb/s. The average upload speed was 7.40 Mb/s with a maximum of 8.85 Mb/s and a minimum of 6.70 Mb/s. Once connected to the internet it was possible to stream video and sound from online resources.

Overall, methods of the present disclosure can provide rapid and low-cost methods for making electrical cables that can be industrially scaled. Cables of the present disclosure can provide reduced use of copper while maintaining or improving electrical properties and strength, as compared to conventional cables, such as data transmission cables.

Although end uses described herein relate to electrical cables, such as data transmission cables, it is to be understood that cables of the present disclosure can be used in any other suitable end use application.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As is apparent from the foregoing general description and the specific embodiments, while forms of the present disclosure have been illustrated and described, various modifications can be made without departing from the spirit and scope of the present disclosure. Accordingly, the present disclosure should not be limited thereby. Likewise whenever a composition, an element or a group of elements is preceded with the transitional phrase "comprising," it is further contemplated that the same composition or group of elements with transitional phrases "consisting essentially of," "consisting of," "selected from the group of consisting of," or "is" preceding the recitation of the composition, element, or elements and vice versa may be used.

While the present disclosure has been described with respect to a number of embodiments and examples, those skilled in the art, having benefit of this disclosure, will appreciate that other embodiments can be devised which do not depart from the scope and spirit of the present disclosure.

What is claimed is:

1. A cable, comprising:

a sheath comprising a heat-shrink material and an interior volume comprising a conductive powder, wherein the cable comprises an electrical conductivity with an average resistance of about 35 Ohm to about 200 Ohm.

2. The cable of claim 1, wherein the average resistance is about 38.7 Ohm to about 182.8 Ohm.

3. The cable of claim 1, wherein the sheath comprises an average thickness of about 100 microns to about 150 microns.

4. The cable of claim 1, wherein the sheath comprises an average thickness of about 150 microns to about 200 microns.

5. The cable of claim 1, wherein the heat-shrink material is selected from the group consisting of polyolefins, ethylene/vinyl alcohol copolymers, ionomers, vinyl plastics, polyamides, polyesters, and combinations thereof.

6. The cable of claim 5, wherein the heat-shrink material is crosslinked.

7. The cable of claim 1, wherein the cable further comprises:

a first end; and a first wire in contact with the conductive powder.

8. The cable of claim 7, wherein the cable further comprises:

a second end; and a second wire in contact with the conductive powder.

9. The cable of claim 8, wherein the first wire and second wire comprise copper.

10. The cable of claim 9, wherein the cable is a data transmission cable configured to transmit electrical signals.

11. The cable of claim 1, wherein the cable is a data transmission cable configured to transmit electrical signals.

12. The cable of claim 1, wherein the conductive powder comprises about 25 wt % to about 45 wt % of the cable.

13. The cable of claim 1, wherein the conductive powder comprises a plurality of carbon nanotubes, wherein the plurality of carbon nanotubes comprise a Brunauer-Emmett-Teller (BET) specific surface area of about 1,315 $m_2$/g to about 1,515 $m^2$/g.

14. The cable of claim 1, wherein the conductive powder comprises a plurality of particles with an average length of about 10 nm to about 10 mm.

15. The cable of claim 1, wherein the conductive powder comprises a plurality of fibers.

16. The cable of claim 15, wherein the plurality of fibers comprise an average length of about 50 nm to about 250 μm.

17. The cable of claim 15, wherein the plurality of fibers comprise an average width of about 5 nm to about 25 μm.

18. The cable of claim 15, wherein the plurality of fibers comprise an average aspect ratio of about 1 to about 2,000,000.

19. The cable of claim 1, wherein the interior volume further comprises an inert filler material.

20. The cable of claim 19, wherein a total amount of the conductive powder and the inert filler material of the interior volume comprises about 75 wt % to about 100 wt % conductive powder.

* * * * *